Sept. 6, 1949.     W. A. STROCK     2,481,363
SPRAY FLUID ROTATED SPRINKLER
Filed March 1, 1945

INVENTOR.
W. A. Strock
BY

Patented Sept. 6, 1949

2,481,363

UNITED STATES PATENT OFFICE 2,481,363

SPRAY FLUID ROTATED SPRINKLER

William A. Strock, Ukiah, Calif.

Application March 1, 1945, Serial No. 580,354

2 Claims. (Cl. 299—126)

The object of my invention has been to produce a novel, simple, and compact form of sprinkling device attachable readily to water hose for sprinkling lawns, and for use in any capacity where sprinkling heads may be desirably employed.

In the carrying out of my invention a further object has been to design my sprinkling device so as to provide a special form of detachable nozzle member whereby interchangeable nozzles may be fitted to the coupling head of the sprinkling device so as to vary the pressure and modify the sprinkling action of the device readily in its actual use.

Still another object of my invention has been to provide a spray unit attachable to the coupling head of my device, said spray unit mounted on the head by anti-friction bearings and the bearing unit itself being so disposed that water directed to the deflecting blades of the spraying head may fall upon the bearing unit in such a way as to provide adequate lubrication therefor, thus dispensing with the necessity for providing a specially lubricated head utilizing an oil lubricant. Furthermore, this feature of my invention is advantageous in that to a large extent the ball bearings used in my bearing unit are not only maintained lubricated, but are, so to speak, self-cleaned by the action of the sprinkling operation in the use of my device.

Still another object of my invention has been to design my sprinkling device in such a way as to enable the various parts thereof to be separated and assembled very quickly so as to enable replacement of the parts when worn, though possibility of the parts being worn is reduced to a minimum by the specific construction of the various elements thereof.

The specific construction of my sprinkling device will be understood more fully upon reference to the following detailed description, and to the annexed drawing, in which.

Figure 1:
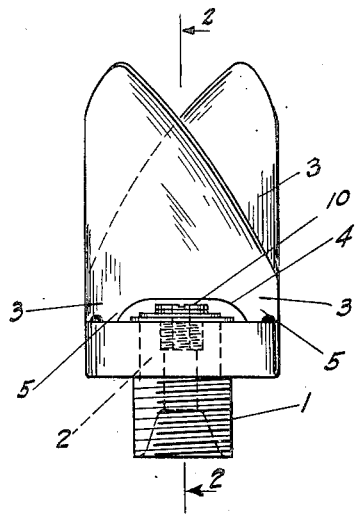
Figure 1 is a view in elevation of a sprinkling unit embodying the essential features of my invention.

Now referring to the details of construction of my invention and particularly to the drawings illustrating one preferred embodiment of the same, it is noted that I utilize for my sprinkling device a suitable coupling member 1 which is externally threaded so as to screw into the end coupling of a hose or like conduit through which the water to be sprinkled or sprayed by means of my device will pass to the spraying or sprinkling parts. The coupling member 1 is formed with a polysided head 2 at its outer end opposite the screw threaded body portion and on this head is mounted the sprinkling unit which is designed to rotate freely relative to the head of the coupling member in the sprinkling operation.

The sprinkling unit is comprised primarily of a plurality of sprinkling or spraying blades which are designated 3 in the drawing. Two of the blades 3 are utilized according to my preferred construction.

The blades 3 comprise broad base portions and they taper toward their outer ends. At the outer extremities of the blades the latter are curved laterally and in opposite directions for the purpose of deflecting the water which is fed to the blades from the conduit or hose through the coupling member 1 which is formed with the central bore 1a for the latter purpose. At the base portions thereof, the blades 3 are also cut out as shown at 4 in order to provide very short leg parts designated 5, these leg parts being attached to the ball bearing unit employed and which will now be described.

The ball bearing unit designed for supporting the blades 3 for free rotation under the impact force set up by the passage of the water or other fluid through the bore 1a of the opening member 1, is comprised of an inner ball race 6 and an outer ball race 7, between which are interposed the usual ball bearings 8 supported in a suitable cage member 9 as customary in the construction of ordinary ball bearing units of the general character employed by me. The inner race of the ball bearing unit is adapted to fit snugly over and upon the polysided head 2 of the coupling member 1 whilst the outer race member 7 is attached to the leg portions 5 of the blade 3 so that as the blades 3 are caused to rotate through the impact force of the water issuing from the bore 1a of the coupling member 1, the outer race 7 carrying the blades will freely rotate at relatively high speed, depending somewhat upon the pressure force exerted by the water passing from the coupling member 1.

At the outer end of the bore 1a of the coupling member 1, I provide a detachable nozzle member 10, this nozzle member being externally threaded so as to screw into a threaded portion of the bore 1a at its outer extremity. At its outer end the nozzle member 10 is formed with crossed kerfs enabling the application thereto of a screw driver when the ball bearing unit and blades 3 are detached from the coupling member 1, thus to permit of removal and replacement of the nozzle member 10 in a convenient manner.

Surrounding the outer end portion of the nozzle member 10 is a washer 11. For holding the ball bearing unit in place, so as to maintain the ball bearing unit and blade upon the coupling member 1, I employ a split brass locking spring ring 12 which is adapted to fit into and lock about an external groove formed in the outer end portion of the head 2, and engage over the inner ball race 6.

By the provision of the parts 11 and 12, the ball bearing unit and the blade 3, as a separate attachment feature, are mounted in detachable relation to the coupling member 1.

Figure 2:
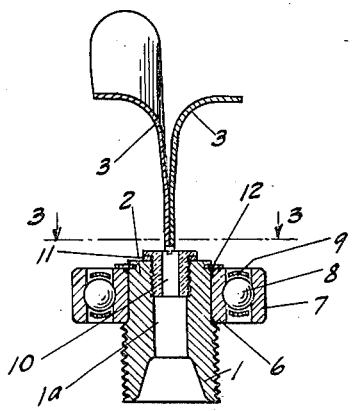
Figure 2 is a vertical sectional view of my device taken about on the line 2—2 of Figure 1.
Figure 3:
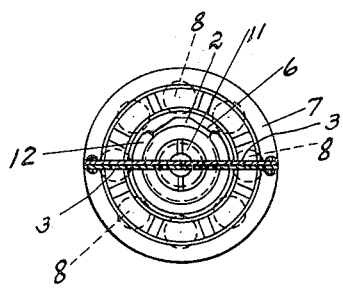
Figure 3 is a horizontal sectional view taken about on the line 3—3 of Figure 1, looking down upon the bearing unit and the coupling head, showing certain parts mounted thereon.
Figure 4:
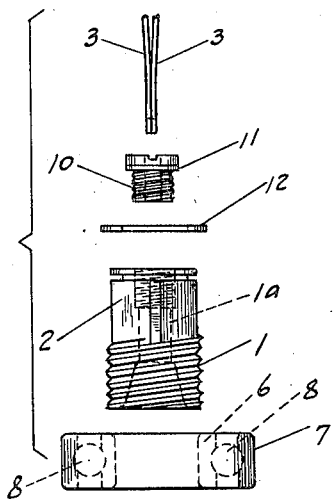
Figure 4 is a disassembled view of my sprinkling device showing the general formation of the separated parts more clearly than visible from the other views of my drawing.
Figure 5:
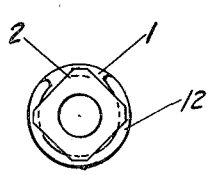
Figure 5 is a plan view showing how the lock ring interlocks with the head of the coupling member.

It will be noted from Figure 2 of my drawings that the arrangement of the base portions of the blades 3 is such that they intersect the outer end of the bore or opening of the nozzle member 10 centrally thereof so that the water or other liquid which issues from the nozzle 10 is divided in such a way as to cause equal quantities thereof to flow to the blades 3 at the outer sides of the base portion of said blade.

In the operation of my invention, it will be evident that the water passing through the bore 1a of the coupling member 1 flows through the bore or central opening of the nozzle 10 and because of the peculiar curved deflection of the outer ends of the blades 3, when the water strikes the curved portions of these blades they are caused to rotate under the impact force of the water in a common or single direction. The blades 3 being mounted upon the outer race members 7 of the ball bearing unit will of course be rotated along with this race member at relatively high speed, and the desired sprinkling or spraying effect of the water is thus obtained.

The construction of the nozzle member 10, as previously intimated, is such as to enable its quick removal and the substitution therefor, of a different size nozzle member to the extent that the opening through the nozzle member may be of different diameter than that illustrated in Figure 2. Thus, by having in hand several nozzle members, the user of my sprinkling device may readily substitute one for another, each member having a different sized exit opening for the water. In this way the pressure of the water as directed to the blades 3 may be varied and different spraying and sprinkling effects derived by the use of the sprinkling unit.

The operation of replacing the nozzle member 10 with a differently apertured member is very simple in that the locking ring 12 may be readily removed laterally from the engagement thereof with the member 2, the ring quickly displaced, and this will enable the blades 3 and the ball bearing unit as a combined structure to be removed from the head 2 of the coupling member 1. Thereupon, by screw driver application to the nozzle member 10, it may be unscrewed and replaced with a different nozzle having a bore of different diameter. This action performed, the fresh nozzle member 10 being replaced, the blades 3 and the ball bearing unit will be replaced over the head 2, and the locking ring 12 is thus reengaged with the head member 2 so as to hold the blade and ball bearing parts in their proper positions as seen in Figure 2.

It will be apparent from the foregoing that the ball bearing unit which I have described is substantially open at its upper portion between the inner race 6 and the outer race 7, and that the water that is directed to the blades 3 may, by gravitation upon the ball bearing unit, amply lubricate the latter as well as keep it cleaned in respect to any dirt or other foreign particles that may drop between the races of the ball bearing unit, and which would otherwise tend to interfere with the free rotation of the blades upon the coupling member 1. The ball bearing, being made of anti-rust metal parts, will not be subject to corrosion, and therefore the lubricating and cleaning action by the water may be safely performed.

Having thus described my invention, what I claim as new and desire to secure by Letters Patent of the United States, is:

1. In a sprinkler, in combination, a water supply coupling member for application to a hose or conduit, said member comprising a poly-sided head having a water passage therethrough, a bearing unit comprising inner and outer bearing members, the inner bearing member having an opening therethrough fitting about the poly-sided head and rendered stationary by the latter, and sprayer blade means carried by the outer bearing member of said bearing unit and comprising blades disposed in the path of movement of water passing through the water passage of said head, and a detachable lock ring carried by the said head for engaging the inner bearing member at the outer end thereof to hold the latter in position on the head, and thereby correspondingly hold the bearing unit emplaced on the head, said detachable ring being removable to enable displacement of the bearing unit and said means supported thereby.

2. A sprinkler comprising the parts as claimed in claim 1, in which a nozzle is detachably connected with the outer end of the head and mounted in the outer end of the water passage through the latter, the blade means comprising blade parts spanning at their inner portions the outer end of the water passage through the head and extending over the outer end of the nozzle member aforesaid in slightly spaced relation thereto so as to prevent displacement of the latter so long as the bearing unit and said means are connected to the head.

WILLIAM A. STROCK.

REFERENCES CITED

The following references are of record in the file of this patent:

UNITED STATES PATENTS

| Number | Name | Date |
|---|---|---|
| 157,353 | Shafer | Dec. 1, 1874 |
| 564,906 | Van Camp | July 28, 1896 |
| 1,215,796 | Gibbs | Feb. 13, 1917 |
| 1,465,681 | Partridge | Aug. 21, 1923 |
| 1,467,601 | Chambers | Sept. 11, 1923 |
| 1,693,245 | Meng | Nov. 27, 1928 |
| 1,725,012 | Meurer | Aug. 20, 1929 |
| 1,760,375 | Ryerson | May 27, 1930 |
| 1,763,912 | Thornton | June 17, 1930 |
| 1,943,073 | Heverly et al. | Jan. 9, 1934 |
| 2,013,387 | Johnston | Sept. 3, 1935 |
| 2,122,055 | Donnellan | June 28, 1938 |
| 2,273,401 | Ferrando et al. | Feb. 17, 1942 |

FOREIGN PATENTS

| Number | Country | Date |
|---|---|---|
| 403,351 | Germany | Sept. 30, 1924 |
| 490,515 | Germany | Jan. 29, 1930 |